United States Patent [19]

Hawkins

[11] 4,391,127

[45] Jul. 5, 1983

[54] PROXIMITY SENSOR

[75] Inventor: William E. Hawkins, Circleville, Ohio

[73] Assignee: E. I. Du Pont de Nemours and Company, Wilmington, Del.

[21] Appl. No.: 252,519

[22] Filed: Mar. 20, 1981

[51] Int. Cl.[3] .............................................. G01B 13/00

[52] U.S. Cl. ...................................................... 73/37.7

[58] Field of Search ........................ 73/37.7, 37.6, 37.5

[56] References Cited

U.S. PATENT DOCUMENTS

| | | | |
|---|---|---|---|
| 3,371,517 | 3/1968 | Roth | 73/37.5 |
| 3,482,954 | 12/1969 | Yuen | 73/37.7 X |
| 3,545,256 | 12/1970 | Beeken | 73/37.5 |
| 3,597,961 | 8/1971 | Pinkstaff | 73/37.5 |
| 3,709,035 | 1/1973 | De Fries et al. | 73/37.5 X |
| 3,881,357 | 5/1975 | Sahlin | 73/37.5 |
| 3,894,552 | 7/1975 | Bowditch | 73/37.5 X |
| 3,942,556 | 3/1976 | Wojcikowski | 73/37.5 X |

FOREIGN PATENT DOCUMENTS

| | | | |
|---|---|---|---|
| 738689 | 7/1966 | Canada | 73/37.7 |

*Primary Examiner*—E. R. Kazenske
*Assistant Examiner*—Joseph W. Roskos

[57] ABSTRACT

A sensor for detecting a break in a continuously advancing web. A vacuum tube extends through a plenum in a jet body. Air under pressure is introduced into the plenum and discharges through an annular orifice surrounding the tube onto a flared end. A low pressure switch in communication with the tube senses the absence of a web from its normal path of advance adjacent the flared end.

3 Claims, 4 Drawing Figures

FIG. 1
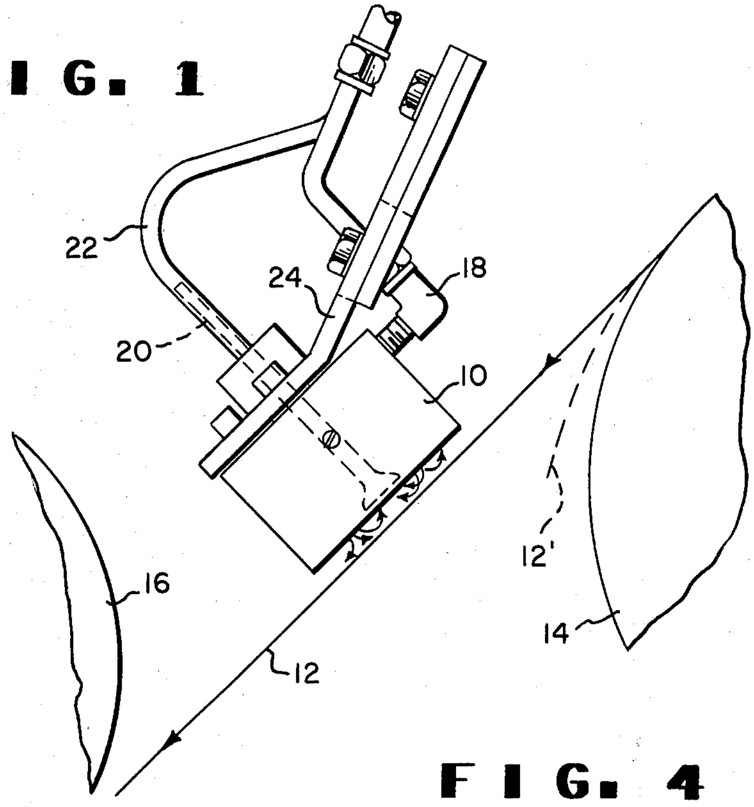
FIG. 4
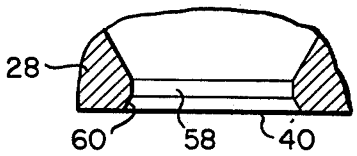
FIG. 3
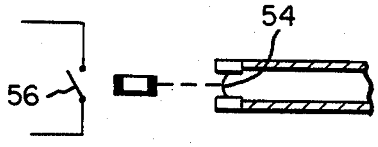
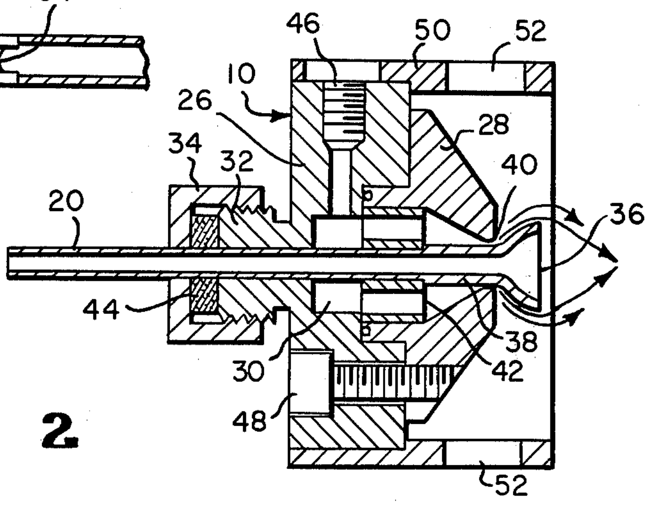
FIG. 2

PROXIMITY SENSOR

BACKGROUND

This invention relates, generally, to the production of thin film and, more particularly, to the detection of breaks or slack conditions in a continuously advancing web or film.

In existing machines, film is produced by extruding a web of molten, polymeric, film-forming materials onto a quench wheel and then advancing the web, under tension, through stretching and slitting stations to one or more windups. In the event of a break and/or a loss of tension, extrusion continues which means that the web must be cut and diverted to waste until the malfunction has been remedied. Reflective photocells have been used to detect discontinuities but are neither reliable not suitable in environments that are either corrosive or explosive. Furthermore, in enclosures for the stretching stations of a film-producing machine, contaminants such as escaping monomers can cloud the photocells and thereby disable the monitoring process.

SUMMARY

With the sensor of the present invention mounted above the normal path of advance, a web can be monitored effectively and reliably. The sensor includes a body having a plenum in communication with inlet and outlet passages for air under pressure. An elongated tube extends through the plenum and projects, at one end, from the outlet passage. The tube is smaller than, and centered on, the passage, leaving an annular orifice that discharges onto a flare at its end. A low pressure switch has a sensing chamber in communication with the tube.

DRAWINGS

FIG. 1 is a side view of the sensor of the present invention and its location adjacent the normal path of advance for a partially-stretched web.

FIG. 2 is a longitudinal sectional view of the sensor.

FIG. 3 is a schematic of the low pressure switch associated with the sensor shown in FIGS. 1 and 2.

FIG. 4 is a fragmentary, enlarged, sectional view of the orifice plate shown in FIG. 2.

DESCRIPTION

In FIG. 1, a sensor 10 is shown adjacent a web 12 in its advance between two rolls 14, 16. The rolls are located at the end of a stretching station in which web 12 is orientation drawn in the machine direction (MD). At a succeeding station, the web is stretched in the transverse direction, yielding a biaxially oriented, thin film.

Air under pressure is introduced through a fitting 18 and a vacuum tube 20 is coupled to a hose 22. Sensor 10 is attached to the frame of the machine by a bracket 24.

Referring to FIG. 2, the body of sensor 10 has a base section 26 and an orifice plate 28. The reduced, upper end of plate 28 fits in a recess in base 26. A recess in plate 26 and a convergent passage through plate 28 define a plenum 30. Base 26 has a threaded boss 32 that receives a cap 34. At one end 36, tube 20 is flared from a length 38 that passes through an orifice 40 in plate 28. Length 38 has an outside diameter less than that of orifice 40. Within plenum 30, tube 20 passes through a tube support 42 that fits between plate 26 and a seat defined by a reduction in the diameter of the tube. Tube 20 extends through passages in base 26 and its boss 32, as well as through a gasket 44 and cap 34. Tube support 42 has four equispaced through holes and thereby functions as a distributor for air introduced to plenum 30 through an inlet passage 46. In plate 28, plenum 30 is tapered inwardly from the tube support 42 to orifice 40.

Base 26 and plate 28 ar held together by fasteners, one of which is shown at 48. A shroud 50 is mounted on the exterior of base 26 and extends to a point beyond the flared end 36 of tube 20. Access for make-up air is provided by four holes 52 in shroud 50.

Hose 22 is in communication with a low pressure switch shown in FIG. 3. In an operable embodiment, a Photohelic® Pressure/Switch Gauge, Series 3000, Dwyer Instruments, Inc., is used. Within the switch, there is a diaphragm 54 and one side of the diaphragm is in communication with tube 20 through hose 22. Diaphragm 54 is coupled to a relay switch 56 and the leads from switch 56 are connected to a programmed controller for the machine.

As shown in FIGS. 2 and 4, the outlet passage through plate 28 is tapered to its least diameter in a short, cylindrical length 58 and terminates in a short, flared length 60.

In operation, air under pressure enters plenum 30 through inlet passage 46, passes through the holes in support 42 and flows through annular jet orifice 40. From the expansion zone defined by the flared outlet of the orifice, the air flows over the curved surface of flared end 36 of tube 20 toward web 12. The sensor 10 is positioned at the centerline of web 12. With the web advancing along its normal path, the converging stream is interrupted, resulting in eddy currents (FIG. 1). As a consequence, there is no suction on the tube 20 and switch 56 (FIG. 3) remains open. In this manner, proximity of the web is sensed by a device having no parts that move or are subject to clouding or clogging. In the event of a broken web, as shown at 12' (FIG. 1), or a slack condition, the stream flowing from flared end 36 recombines (FIG. 2) at a point dependent on air velocity, the diameter of flared end 36 and static pressure in the adjoining zone. The aspirating effect of the uninterrupted flow creates a suction in tube 20 and in the chamber on one side of diaphragm 54. Movement of the diaphragm closes switch 56 and the programmed controller initiates an automatic diversion of the continuously advancing web to a waste collector.

What is claimed as new and desired to be secured by Letters Patent is:

1. A proximity sensor comprising:
   - a body having a plenum therein in communication with inlet and outlet passages;
   - an elongated tube extending through the plenum and projecting from the outlet passage, said tube having a lesser diameter than the outlet passage, presenting an annular discharge orifice, and a flared end located externally of said body and the discharge orifice; and
   - a pressure switch having a sensing chamber in communication with the tube.

2. The sensor of claim 1 wherein said outlet passages terminates in a short, flared length and the flared end of said tube has a curved exterior.

3. The sensor of claim 2 wherein is provided a shroud on said body, said shroud extending to a point beyond and being spaced from the flared end of said tube.

* * * * *